Re 8090 2-19-1878
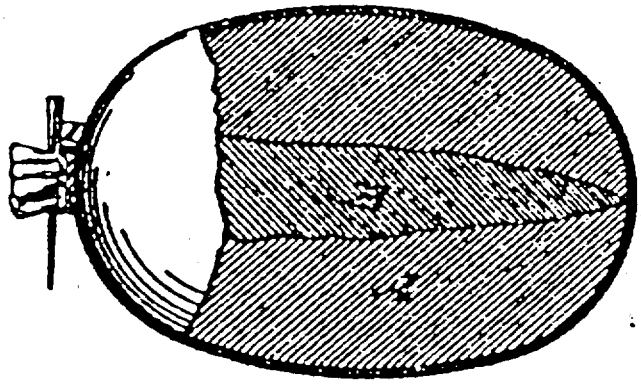

UNITED STATES PATENT OFFICE.

DAVID C. LINK, OF NEW YORK, N. Y.

IMPROVEMENT IN PROCESSES FOR PRESERVING MEATS.

Specification forming part of Letters Patent No. 194,693, dated August 28, 1877; Reissue No. 8,090, dated February 19, 1878; application filed February 1, 1878.

*To all whom it may concern:*

Be it known that I, DAVID C. LINK, of the city, county, and State of New York, have invented a new and Improved Process for Preserving Meats, of which the following is a specification:

My invention relates to a new process of putting up and preserving meats.

In carrying out my invention I take a solid piece of sweet-pickled meat, such as ham, and then withdraw every particle of bone, and fill the vacancy caused thereby with a piece of lean meat, such as ham, loin, or tongue, which has previously been pickled. I then take the meat and press it into a bladder, which has been expressly cleaned for the purpose, through as small an aperture as possible, and tie the opening tightly together, this process being facilitated by the use of a skewer. I then wind the bladder containing the piece of meat in different directions with a strong cord, to give it a symmetrical form. I then hang it over a smoking fire until it is sufficiently browned, after which it is boiled for about three hours. I next smear the bladder with sirup, for the purpose of closing any holes therein and perfectly excluding the air, also to provide a coat, which will be subsequently available for covering the meat should it be exposed at any point by piercing the bladder with a "trier" or other instrument for testing the quality of the meat. After thus coating the meat it is chilled by placing it in a cool room. The cord is then removed, and the meat ready for use.

In the accompanying drawing, which represents a ham partly in section, A is the ham; B, the inserted piece; C, the bladder; D, the binding-cord, and E the skewer.

It will be observed that my process differs in various ways from that usually employed in preserving hams.

By my process the ham is smoked and boiled while still inclosed in the case or bladder, and it is thus not only preserved, but prepared for immediate use upon the table.

In putting up the ordinary "sugar-cured" ham it is smoked before being sewed into a canvas bag, but is not boiled, and hence requires to be cooked after coming into the hands of the consumer.

Another advantage is derived from the meat being smoked and boiled—that is to say, completely cooked while contained in the bladder—namely, the juices of the meat are preserved, and prevented from escaping, so that they tend to soften the skin adhering to the meat, and render it soft and jelly-like, in place of hard, dry, and unpalatable, as when cured and preserved by the ordinary processes.

Further, the bladder, being always drawn tightly together at the slit or opening, is made to fit snugly around the meat, and adjust itself to its shape and size, and being very thin, and also transparent, it permits inspection of the meat to the extent of perceiving whether it is fat or lean, which is frequently a matter of importance to the purchaser, to prevent mistake or imposition.

The skin covering adhering to the meat, and likewise presenting no objectionable appearance, does not require to be removed to prepare the meat for the table; but slices may be cut off, and even served with a portion of the bladder attached to the edge.

I desire to state that, while I prefer to insert a piece of meat in the cavity formed by extraction of the bone, I do not restrict my self to that as an indispensable step of my process; but, on the other hand, while I greatly prefer the practice, I do not claim it is new to extract bones from meat by withdrawing them in place of cutting them out by slicing through the meat down to the bones; nor do I claim, broadly, putting up meat in the intestines of swine or other animals, since I am aware chopped meats have been preserved in that manner.

I am also aware that bladders have been used for preparing lard and head-cheese for the market, and make no claim thereto.

By the term "solid meat" in this specification I mean meat uncut, in contradistiction to chopped meat.

What I claim is—

The improved process of preserving solid meat and preparing it for use, substantially as hereinbefore described, the same consisting in first removing the bone from the previously pickled meat, then placing it in a self-adjusting bladder, and smoking and boiling it while so inclosed, substantially as set forth.

DAVID C. LINK.

Witnesses:

A. V. BRIESEN,

T. B. MOSHER.